United States Patent Office 2,985,610
Patented May 23, 1961

2,985,610
CONDENSATION PRODUCTS OF POLYMERIC OXIMES AND AMINOPLASTS AND METHOD OF MAKING SAME

Joseph A. Blanchette, East Longmeadow, and Earl C. Chapin, Springfield, Mass., assignors to Monsanto Chemical Company, St. Louis, Mo., a corporation of Delaware No Drawing. Filed July 18, 1958, Ser. No. 749,319

7 Claims. (Cl. 260—30.4)

This invention relates to novel surface coating compositions. More particularly, it relates to novel polymeric oxime-aminoplast condensates and their use as surface coating resins.

It has long been known to employ aminoplast resins, particularly those modified with other polymeric materials such as alkyd resins, etc., in surface coating applications. For example, baking enamels containing such aminoplast compositions are commonly used as finishes on automobile bodies. These enamels possess many superior properties including excellent solvent resistance, optical clarity and hardiness. However, such enamels lack flexibility and thus tend to chip when subjected to rough use.

It is an object of this invention to provide novel surface coating compositions.

Another object is the provision of novel condensates of aminoplasts with polymeric oximes.

A further object is the provision of solvent resistant surface coatings having both the flexibility and the hardness necessary to provide long wear under severe conditions.

These and other objects are attained through the use of a novel surface coating composition comprised essentially of from 1–75 parts by weight of an aminoplast and from 99–25 parts by weight of a polymeric oxime dissolved in an organic solvent. The aminoplast and the polymeric oxime must each have an average of at least two functional groups per molecule and polymeric chain, respectively, and are otherwise as hereinafter described.

The following examples are given in illustration of the invention and are not intended as limitations thereof.

Example I

About 5 grams of a styrene-methacrolein copolymer containing about 5.6 milliequivalents of carbonyl groups per gram are dissolved in about 20 ml. of dioxane. This solution is then added slowly, with stirring, to a solution of about 3 grams of hydroxylamine-hydrochloride dissolved in about 25 ml. of pyridine. When the exothermic reaction is complete the copolymer is precipitated by pouring the reaction mixture into an excess of water. The precipitate is washed with water and vacuum dried at about room temperature yielding about 6.2 grams of a white powder. Analysis of the product shows it to be the oxime of the initial styrene-methacrolein copolymer. Infrared spectrophotometry indicates that substantially all of the carbonyl groups thereof have been converted to oxime groups.

Example II

A solution of 100 grams (about 0.8 mol) of melamine, 450 grams (about 5.4 mol) of 37% formalin and 40 grams (about 0.25 mol) of p-toluene sulfonamide dissolved in 500 grams of butanol is adjusted to a pH of about 10 with caustic soda and is then refluxed for about 1 hour. Thereafter, the pH is brought to about 5 with formic acid and substantially all of the water is removed by azeotropic distillation. Finally sufficient xylene is added to bring the solution to about 60% solids by weight. The product is a solution of a mixture of partially butylated polymethylol melamines modified with p-toluene sulfonamide.

Example III

About 5 grams of the oxime of styrene-methacrolein copolymer obtained in Example I are dissolved in about 5 grams of a 50/50 xylene-butanol mixture to make a 50% solids solution. About 6 ml. of this polymeric oxime solution is mixed with about 2 ml. of the aminoplast composition of Example II. This mixture is cast on a clean stainless steel plate in a uniform 0.003 inch film and then is oven-baked for 20 minutes at 150° C. A clear, almost colorless, hard, mar resistant film is obtained. This film is not softened or lifted by steam and is insoluble in xylene-butanol mixtures, dioxane and dimethyl formamide.

Example IV

About 5 grams of a styrene-methyl vinyl ketone copolymer containing about 70% styrene by weight and about 5 grams of hydroxylamine hydrochloride are dissolved in about 60 ml. of an anhydrous 50/50 ethanol-pyridine mixture. The solution is refluxed for about 3 hours and then is poured into an excess of cold water to precipitate the copolymer. The precipitate is washed with water and vacuum dried at about room temperature yielding about 5.5 grams of a white powder which is identified as the oxime of the initial styrene-methyl vinyl ketone copolymer. Infrared spectrophotometry indicates that substantially all of the carbonyl groups thereof have been converted to oxime groups.

Example V

About 5 grams of the oxime of styrene-methyl vinyl ketone copolymer obtained in Example III are dissolved in about 5 grams of dioxane to make a 50% solids solution. This polymeric oxime solution is mixed with about 8 ml. of a 60% solids solution of tetramethylol benzoguanamine dissolved in dioxane. This mixture is cast on a clean stainless steel plate in a uniform 0.003 inch film and then is baked for 30 minutes at 100° C. A clear, hard, tough film is obtained. This film is not softened or lifted by steam and is insoluble in xylene-butanol mixtures and dioxane.

Example VI

Example V is repeated using in place of the tetramethylol benzoguanamine thereof, about 10 ml. of a 50% solids solution of a methylol urea composition prepared by refluxing a dioxane solution of 2 mols of formaldehyde and 1 mol of urea, removing substantially all of the water by azeotropic distillation and adding sufficient dioxane to bring the solution to about 50% solids by weight. A clear, almost colorless, hard, mar-resistant film is obtained.

Similar results are obtained using the oxime of an acrylonitrile-methyl vinyl ketone copolymer containing 50% acrylonitrile by weight or the oxime of acetylpolystyrene in place of the polymeric oximes of Examples III, V and VI.

The aminoplasts employed in this invention are methylol amide compounds, methylolamino substituted diazines and triazines, and the alkyl, aryl and aralkyl substituted derivatives thereof containing one or more of one of the following structural units per molecule.

(a) 

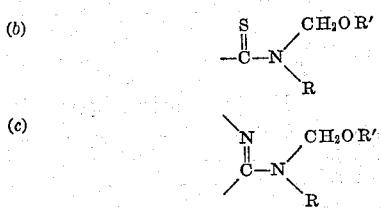

In each of the above formulae R is either a hydrogen, a methylol, a 1–4 carbon atom alkyl or a —CH₂OR' radical and R' is either a hydrogen or a 1–10 carbon alkyl radical. The aminoplast used must contain an average of at least two methylol groups per molecule, whether they be present as at least 1 dimethylolamino group or as at least 2 monomethylolamino groups or as a mixture of mono- and di-methylolamino groups. Commercially, aminoplasts are frequently available only in the form of their partially polymerized or partially etherified or partially polymerized-partially etherified derivatives. Any of these derivatives may be used. The etherified aminoplasts correspond to the embodiment of this invention wherein R' in the above formulae is a 1–10 carbon atom alkyl radical. The butyl ether is preferred. Examples of suitable aminoplasts include:

(a) Ureas such as dimethylolurea, partially polymerized methylol urea, partially butylated dimethylol urea, etc. and amides such as dimethylolbenzamide, dimethylol butyramide, etc.

(b) Thioureas such as dimethylol thiourea, partially ethylated thiourea, etc. and thioamides such as dimethylolthiobenzamide, dimethylol thiobutyramide etc.

(c) 1,2-, 1,3- and 1,4-diazines such as 3,6-di(dimethylolamino) pyridazine, 2-dimethylolamino pyrimidine, 2,4-di(monomethylolamino) pyrimidine, 2-dimethylolamino pyrazine, etc. and symmetrical, asymmetrical and vicinal triazines such as hexamethylol melamine, trimethylol melamine, tetramethylol benzoguanamine, dimethylol benzoguanamine, the partially butylated ether of tetramethylol melamine, the partially butylated ether of tetramethylol benzoguanamine, 3-dimethylolamino - a - triazine, 4,6-di(monomethylolamino)-v-triazine, etc.

In many instances, the specific nature of commercial aminoplast compositions is not readily ascertainable. However, such compositions may be employed as long as the overall composition is such as to at least theoretically form one of the above-specified aminoplasts. For example, the product obtained by condensing 1 molar proportion of melamine and 6 molar proportions of formaldehyde in the presence of butanol is not the theoretically expected partially butylated ether of hexamethylol melamine. Rather, a mixture of the partially butylated ethers of polymethylol melamines, chiefly tri-, tetra-, penta- and hexa-methylol melamines, is obtained.

The polymeric oximes employed in this invention are polymeric aldoximes and ketoximes derived from the reaction of hydroxylamine with vinyl polymers containing an average of at least two carbonyl groups per polymer chain. Polymeric oximes wherein substantially all of the carbonyl groups have been converted to oxime groups are preferred. However, within the broader scope of this invention, it is only necessary that an average of at least 2 carbonyl groups per polymer chain be converted to oxime groups. The carbonyl containing vinyl polymers from which these polymeric oximes are prepared include polyaldehydes, polyketones, copolymers of carbon monoxide and alpha, beta-ethylenically unsaturated monomers and copolymers of (a) styrene or alpha-substituted styrenes or the halo- or alkyl-ring substituted derivatives thereof, acrylates, methacrylates, acrylonitrile or methacrylonitrile and (b) vinyl aldehydes or alkyl alkenyl ketones. Examples of suitable oxime polymers include the oximes of such polymers as acetylpolystyrene, polyacrolein, polymethacrolein, poly - (methylvinylketone), poly-(methylisopropenylketone), etc. and ethylene-carbon monoxide, tetrafluoroethylene-carbon monoxide, vinyl chloride-carbon monoxide, acrylonitrile-carbon monoxide, styrene-acrolein, styrene-methacrolein, alpha-methylstyrene-methylisopropenylketone, acrylate-acrolein, methacrylonitrile-methylvinylketone, etc., copolymers of styrene or alphamethylstyrene with acrolein, methacrolein, methyl vinyl ketone or methyl isopropenyl ketone form an especially preferred embodiment of this invention.

These polymeric oximes are best prepared by dissolving the carbonyl containing vinyl polymer in an organic solvent, e.g., dioxane, pyridine, methanol, etc. and subsequently reacting the dissolved polymers with hydroxylamine at a temperature of about 20–100° C. and under near neutral conditions. The more stable hydrogen chloride salt of hydroxylamine may be employed if desired; however, the use thereof necessitates the presence of a tertiary base as a hydrogen chloride acceptor.

The surface coating compositions of this invention are essentially solutions of from 1–75 parts by weight of the aminoplast and from 99–25 parts by weight of the polymeric oxime, the total thereof being 100 parts by weight, dissolved in an organic solvent. The organic solvents employed must be inert to the aminoplast, the polymeric oxime and the reaction therebetween. Conventional organic solvents in which both components are soluble may be employed, e.g., toluene, dioxane, xylene, etc. and mixtures thereof with, e.g., butanol, mineral spirits, etc. Sufficient solvent is employed to produce surface coating compositions containing from 10–70% by weight of total solids, i.e., aminoplast plus polymeric oxime.

Surface coating compositions containing from 5–35 parts by weight of the aminoplast and from 95–65 parts by weight of the polymeric oxime are especially preferred in that they produce films having the optimum combination of the desired properties. Similarly, surface coating compositions containing from 40–60% by weight of total soilds, i.e., aminoplast plus polymeric oxime, are commercially preferable and produce more uniform films.

The surface coating compositions of this invention may be applied to various sub-strata according to conventional techniques, e.g., casting, printing, spraying, painting, etc. For example, the surface coating composition may be sprayed in a uniform film on a surface such as wood, glass, metal, etc. and then baked at a temperature of from 60–250° C. to react the polymeric oxime with the aminoplast and simultaneously evaporate the solvent; resulting in a cross-linked film. Although not necessary, the reaction may be accelerated, especially at lower temperatures, by the presence of a small quantity of an acidic catalyst, e.g., p-toluene sulfonic acid, diethyl phosphoric acid, ammonium chloride, etc. In the absence of such a catalyst, temperatures of from 125–175° C. are optimum.

The cross-linked surface coatings prepared according to the teachings of this invention are characterized by their superior adhesion, particularly to polar surfaces, their optical clarity and their outstanding solvent resistance. For example, these films are insoluble in the previously described solvents in which the parent polymeric oximes and aminoplasts are soluble. They are also insoluble in such solvents as dimethylformamide, etc. Those films which contain low proportions of aminoplast, i.e., as low as 1 part of aminoplast to 99 parts of polymeric oxime, are generally quite flexible and relatively soft. Those which contain high proportions of aminoplast, i.e., up to 75 parts of aminoplast to 25 parts of polymeric oximes, are, on the other hand, relatively hard and rigid. Films prepared from surface coating compositions containing from 5–35 parts of aminoplast per 100 parts of aminoplast plus polymeric oxime are preferred for applications requiring long wear under severe use since such films combine high flexibility with the necessary hardness.

The surface coating compositions of this invention are useful in producing decorative laminates, counter-tops, baking enamels for use on electrical appliances, stoves, refrigerators, automobile bodies and interiors, etc. They are further useful as binders and sizes for paper and textiles, as thermosetting molding compounds, etc.

Conventional additives such as pigments, stabilizers, plasticizers, fillers, waxes, etc. may be incorporated into the surface coating compositions of this invention to modify the properties of films prepared therefrom.

It is obvious that many variations may be made in the products and processes as set forth above without departing from the spirit and scope of this invention.

What is claimed is:

1. A surface coating composition comprising (a) from 1-75 parts by weight of an aminoplast containing an average of at least 2 methylol groups per molecule and (b) from 99-25 parts by weight of a polymeric oxime containing an average of at least 2 oxime groups per polymeric oxime chain; said aminoplast being selected from the group consisting of the formaldehyde condensation products of ureas, diazines, triazines and the 1-10 carbon atoms alkyl ethers thereof.

2. A surface coating composition as in claim 1 containing from 5-35 parts by weight of the aminoplast and from 95-65 parts by weight of the polymeric oxime.

3. A surface coating composition comprising (a) from 5-35 parts by weight of a methylol melamine containing an average of at least 2 methylol groups per molecule and selected from the group consisting of the formaldehyde condensation products of melamine and the 1-10 carbon atom alkyl ethers thereof and (b) from 95-65 parts by weight of an oxime of a styrene-vinyl aldehyde copolymer containing an average of at least 2 oxime groups per polymeric oxime chain and being substantially free of carbonyl groups; the vinyl aldehyde moiety of said styrenevinyl aldehyde copolymer being selected from the group consisting of acrolein and methacrolein.

4. A surface coating composition comprising (a) from 5-35 parts by weight of a methylol melamine containing an average of at least 2 methylol groups per molecule and selected from the group consisting of the formaldehyde condensation products of melamine and the 1-10 carbon atom alkyl ethers thereof and (b) from 95-65 parts by weight of an oxime of a styrene-alkyl alkenyl ketone copolymer containing an average of at least 2 oxime groups per polymeric oxime chain and being substantially free of carbonyl groups; the alkyl alkenyl ketone moiety of said styrene-alkyl alkylene ketone copolymer being selected from the group consisting of methyl vinyl ketone and methyl isopropenyl ketone.

5. A surface coating composition comprising (a) from 5-35 parts by weight of a methylol urea containing an average of at least 2 methylol groups per molecule and selected from the group consisting of the formaldehyde condensation products of urea and the 1-10 carbon atom alkyl ethers thereof and (b) from 95-65 parts by weight of an oxime of a styrene-vinyl aldehyde copolymer containing an average of at least 2 oxime groups per polymeric oxime chain and being substantially free of carbonyl groups; the vinyl aldehyde moiety of said styrene-vinyl aldehyde copolymer being selected from the group consisting of acrolein and methacrolein.

6. A surface coating composition comprising (a) from 5-35 parts by weight of a methylol urea containing an average of at least 2 methylol groups per molecule and selected from the group consisting of the formaldehyde condensation products of urea and the 1-10 carbon atom alkyl ethers thereof and (b) from 95-65 parts by weight of an oxime of a styrene-alkyl alkenyl ketone copolymer containing an average of at least 2 oxime groups per polymeric oxime chain and being substantially free of carbonyl groups; the alkyl alkenyl ketone moiety of said styrene-alkyl alkenyl ketone copolymer being selected from the group consisting of methyl vinyl ketone and methyl isopropenyl ketone.

7. A process for the preparation of novel surface coatings which comprises (1) dissolving (a) from 1-75 parts by weight of an aminoplast containing an average of at least 2 methylol groups per molecule and (b) from 99-25 parts by weight of polymeric oxime containing an average of at least 2 oxime groups per polymeric oxime chain in an organic solvent inert to said aminoplast and polymeric oxime and the reaction therebetween to prepare a solution containing a total of from 10-70% by weight of solids, (2) applying said solution to a substrata and (3) curing said film at a temperature of from 60-250° C.; said aminoplast being selected from the group consisting of the formaldehyde condensation products of ureas, diazines and triazines and the 1-10 carbon atom alkyl ethers thereof.

FOREIGN PATENTS 751,934    Great Britain _____ July 4, 1956